Dec. 17, 1957  F. T. SMITH  2,816,497
TRACTOR IMPLEMENT COUPLING DEVICE
Filed Oct. 22, 1952  4 Sheets-Sheet 1
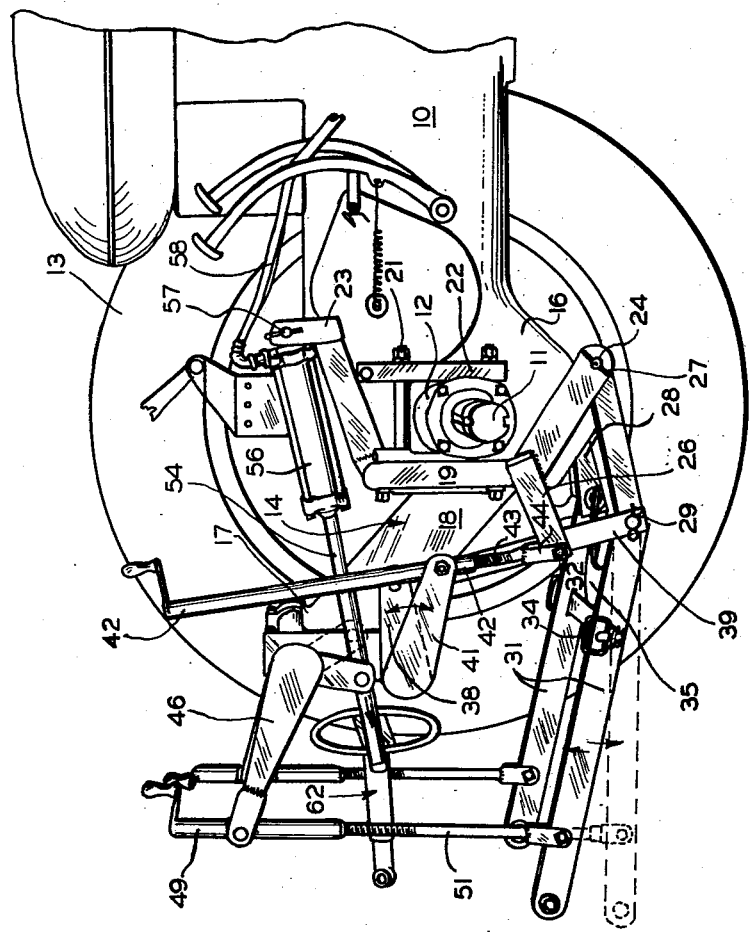
FIG-1
*INVENTOR.*
FRED T. SMITH
BY
ATTORNEY

INVENTOR.
FRED T. SMITH
BY
ATTORNEY

Dec. 17, 1957  F. T. SMITH  2,816,497
TRACTOR IMPLEMENT COUPLING DEVICE
Filed Oct. 22, 1952  4 Sheets-Sheet 3

*INVENTOR.*
FRED T. SMITH
BY
ATTORNEY

Dec. 17, 1957     F. T. SMITH     2,816,497
TRACTOR IMPLEMENT COUPLING DEVICE
Filed Oct. 22, 1952     4 Sheets-Sheet 4
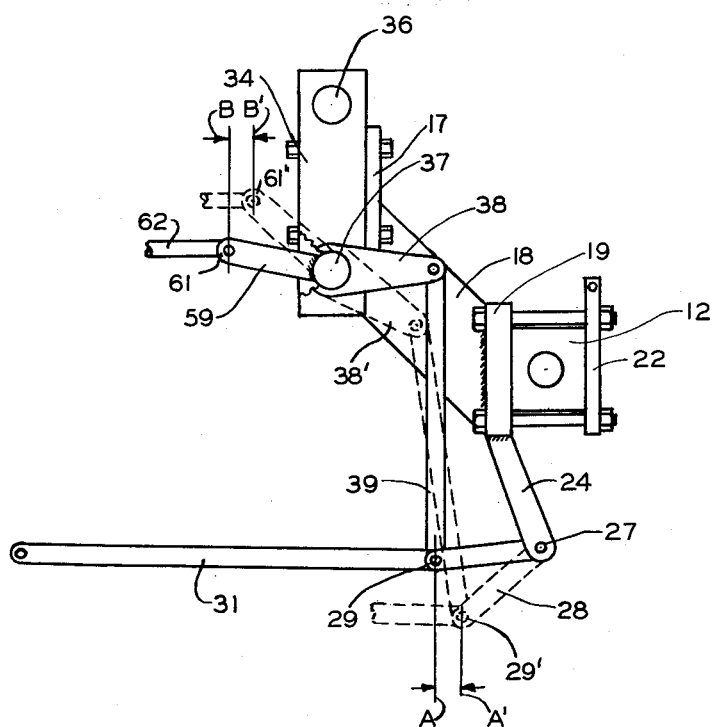
FIG. 6
INVENTOR.
FRED T. SMITH
BY 

United States Patent Office 2,816,497
Patented Dec. 17, 1957

2,816,497

TRACTOR IMPLEMENT COUPLING DEVICE

Fred Thomas Smith, Golden, Colo., assignor, by mesne assignments, to The Calkins Manufacturing Company Application October 22, 1952, Serial No. 316,280

4 Claims. (Cl. 97—47.58)

My invention relates to apparatus for coupling soil engaging implements, such as a plow, to a prime mover, such as a tractor, in such manner as to permit the operator to select any desired degree of implement draft and thereafter to automatically maintain such draft during operation.

Draft, as herein employed, should be understood as meaning the resistance of the implement to movement through the soil, and is not to be confused with implement penetration into the soil even though these are related. It is well known that within a relatively small plot of ground the consistency of the soil will vary considerably, this variation being in some instances sufficiently great to prevent further movement of the tractor. Under such circumstances the penetration of the implement into the ground must necessarily be reduced to permit further movement, this usually being accomplished by manual control of a system of levers or their equivalent.

A primary object of this invention is to provide means for coupling a soil engaging implement to a tractor which will automatically maintain the draft of the implement substantially constant during operation, and which permits the operator to readily and conveniently select any desired degree of draft within the range of the coupling and within the capabilities of the tractor.

Another important object of this invention is to provide a coupling of the type described which may be temporary or permanently secured to the rear of a tractor.

A still further important object of this invention is the provision of a coupling of the type described which permits lifting of the implement from the ground.

Other important objects of this invention will be disclosed in a course of the following description and in the appended drawings, in which:

Fig. 1 is a partially broken away perspective elevation of a form of my invention;

Figure 6 is a partial elevation of a portion of the mechanism illustrated in Figures 1 and 2, omitting certain parts for clarity and illustrating relative movement of the components.

Figure 2:
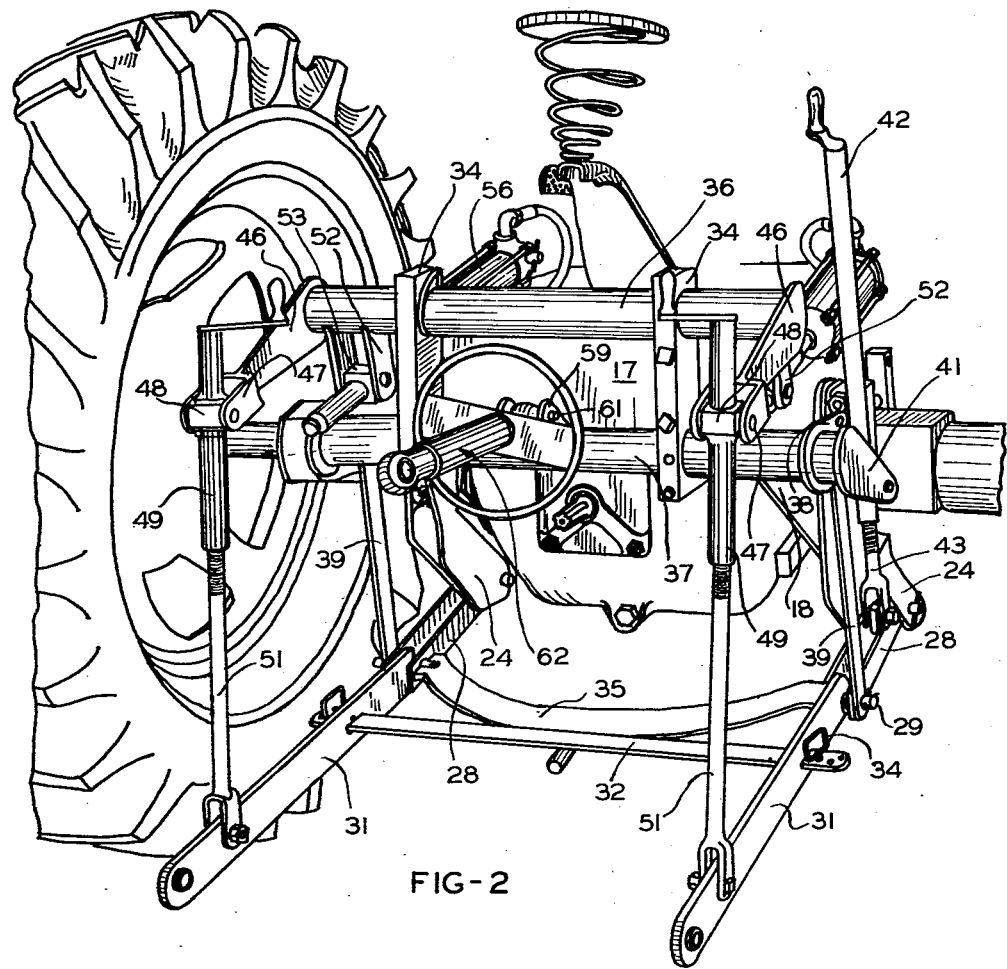
Fig. 2 is a perspective view of the device shown in Fig. 1.
Figure 3:
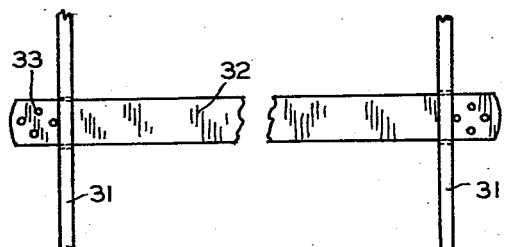
Fig. 3 is a partial plan view of a spreader bar utilized in the device shown in Fig. 2.
Figure 4:
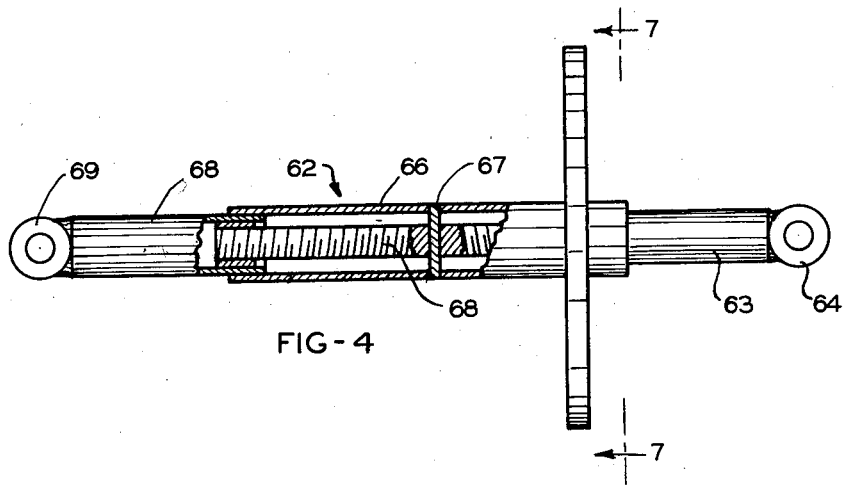
Fig. 4 is a partially broken away elevation of a portion of the device shown in Fig. 2.
Figure 5:
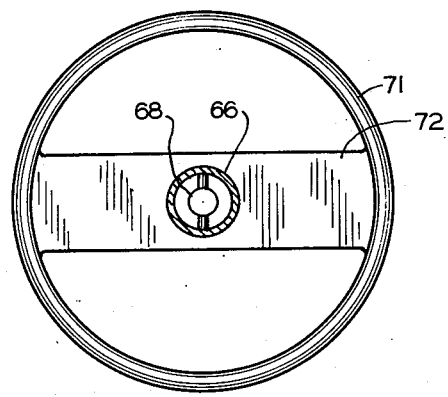
Fig. 5 is a cross section of the device shown in Fig. 4 taken along the lines 7—7 thereof.

By way of preliminary explanation, my coupling utilizes two spaced lower arms pivoted at their rear ends to the implement, and at their forward ends either directly to the tractor or to a coupling frame member secured rigidly to the tractor. An upper arm is also pivotally attached at its forward end to the tractor or the coupling frame at a point above the lower arms and extends rearwardly into pivotal engagement with the implement at a point above a connection between the implement and the lower arms. The soil engaging portion of the implement projects downwardly below the lower arms and is designed in operation to penetrate the soil, thus generating a generally horizontal force opposing forward movement of the implement and tractor, herein termed the "draft force."

During operation, gravity generates a force component acting downwardly on the implement and tending to force the implement deeper into the soil. This downward force component may be supplemented or opposed by another force component, the direction and magnitude of which varies with the shape and disposition of the soil penetrating portion of the implement. I have discovered that these force components may be selectively supplemented, neutralized, or overcome by properly disposing the arms angularly with respect to the direction of the draft force. When so disposed, upward or downward force components acting on the implement through the coupling will be generated. The magnitude of these components vary with the angle of the arms and directly with the magnitude of the force component. Thus, if the forward ends of the lower arms are raised with respect to the rear ends of the same arms, a relatively acting force component is generated which becomes greater in magnitude as the angle of the arm to the direction of draft force is increased. Similarly, if the forward end of the upper arm is lowered with respect to the rear end another upwardly acting force component is generated, this component being generally smaller in magnitude than that generated by the same displacement of the lower arms. Thus, by varying the relative position of the forward ends of the lower arms, the operator may control the draft of the implement.

In operation, the implement will penetrate the soil until all of the vertical force components acting on the implement are in balance, i. e., the upward components equal the downward components. Any change in the draft force changes the magnitude of at least one of these components, thus forcing the implement upwardly or downwardly until balance is re-established. Corrective movement of the implement is of course virtually instantaneous, since the forces are transmitted by rigid mechanical members.

From this brief explanation, it will be apparent that the precise configuration of my coupling is of only secondary importance and may be varied to permit application to tractors and the like of varying design.

Figure 1 illustrates a form of my invention suitable for attachment to a standard form of farm tractor having a frame 10, a rear axle 11 including a housing 12 and rear wheels 13. A majority of farm tractors and the like are provided with a conventional drawbar to which a drawn implement may be pivoted. This, however, provides only a single point of connection between the implement and the tractor and is not suitable for my purposes. I, therefore, provide a coupling frame, generally designated 14, for attachment to the rear axle of the tractor on opposite side of the tractor differential 16. The frame 14 includes an upright cross member 17 disposed in a vertical plane and extending transversely across the central rear portion of the tractor. A pair of forwardly and downwardly extending arms 18 connect the cross member to a generally upright member 19 held securely against the axle housing 12 by bolts 21 extending through the member 19 and a clamp plate 22. L-shaped arms 23 extend forwardly and upwardly from the upper ends of the members 19. Arms 24 extend forwardly and downwardly from the lower ends of the members 19 and arms 26 extend downwardly and rearwardly from the same point, the arms 23, 24, and 26 being all secured rigidly to the member 19.

Pivot pins 27 are mounted near the lower ends of the arms 24 and pivotally support arms 28 which extend rearwardly therefrom. Pivot pins 29 are employed to pivotally connect the rear or trailing ends of the arms 28 with the forward ends of lower draft arms 31. A bar 32 extends transversely through openings formed in the lower draft arms 31 and is provided with a series of openings 33 through which pins 34 may extend, the latter being employed to limit outward movement of the draft arms 31. A spreader bar 35 may also be utilized, and connected to the pins 29.

A pair of laterally spaced bearing blocks 34 (Fig. 2) are secured to the coupling frame cross member 17 and rotatably support a transverse lifting bar 36 and a control bar 37. Lever arms 38 are rigidly secured at one end to the control bar 37 and pivotally engage downwardly extending straps 39, the latter being connected near their lower extremities to the arms 28 and 31 by the pins 29. Another lever arm 41 is also fixed to the control bar 37 and movably engages an internally threaded elongated handle 42. A screw 43 threadedly engages the handle 42 and is provided at its lower end with a clevis 44 pivotally secured to arm 26. Thus, it may be seen that rotation of the handle 42 moves the arms 41 and 38 arcuately up and down, thus rocking the control shaft 37 which in turn raises or lowers the pin 29 and the forward ends of the lower draft arms 31.

Lever arms 46 are secured to the lifting bar 36 and terminate in clevis 47 in which blocks 48 are pivotally mounted. Internally threaded elongated handles 49 are journaled in the blocks 48 and threadedly engage downwardly extending screws 51, the lower ends of which are pivotally secured to the arms 31 near their extremities. Arms 52 are also secured as by welding to the lifting bar 36 and pivotally support blocks 53, which in turn receive and support piston rods 54 and reciprocally mounted hydraulic cylinders 56. Cylinders 56 are pivotally secured as by pins 57 to the arms 23 and are supplied with fluid under pressure through flexible conduits 58.

A pair of arms 59 are fixed to the control bar 37 between the bearing blocks 34 and extend upwardly and rearwardly therefrom. A generally horizontal pin 61 pivotally connects the arms 59 with an upper control arm, generally designated 62. The joint defined by the pin 61 is preferably loose to permit free but limited movement. To permit variation in length, the upper arm 62 includes internally threaded member 63 having an eye 64 for engagement with the pin 61. Tubular member 66 is telescoped over an end of the member 63 and is secured as by a pin 67 to a screw 68 within a tubular member 66. The screw 68 has right hand threads engaging the threaded member 63 and left hand threads engaging a similar internally threaded member 68 also telescoped within the member 66 and having an eye 69 for pivotal engagement with the implement. A handwheel 71 is connected to the member 66 by a cross bar 72.

The characteristic to be particularly noted with reference to the above described coupling is that operation of the handle 42 will cause rocking of the control bar 37, which in turn raises or lowers the pins 29. Thus, during operation, if the operator lowers the pins 29, thereby depressing the forward ends of the lower draft arms 31, the draft of the implement will be increased. A reduction in draft is, of course, accomplished by raising the pins 29.

It will also be noted that if the pins 29 are lowered, the distance from the tractor axle to the implement is, in effect, shortened. Thus, unless this movement is compensated, the vertical angle of the implement will be slightly changed. However, since the arms 59 on the control bar 37 also move angularly, the upper control arm 62 is also moved forwardly, the distance of movement being sufficient to substantially compensate for the forward movement of the pin 29. It will also be noted that downward movement of the pin 29 is accompanied by upward movement of the pin 61, each of these movements being effective to increase the draft of the implement by developing downwardly acting components of the draft force. The relative movements of the components described are illustrated most clearly in Figure 6. In this figure I have shown the heavy upright cross member 17, which is essentially a steel plate, welded to arms 18 which are in turn welded to the clamp 19 held securely to the axle housing 12. Thus, the cross member 17 and the bearing blocks 34 are rigid with respect to the tractor. The arms 59 and 38 are rigidly secured, as by welding, to the shaft 37. In Figure 6 it has been assumed that the shaft 37 is rocked in a clockwise direction, thus moving the pivot point 61 on the arm 59 upwardly to a position 61' indicated by dotted lines. This movement causes the point 61 to move toward the member 17 and the tractor by a distance B—B'. The clockwise rotational movement of the shaft 37 also causes the arm 38 to move from its full line to its dotted line position, the latter being indicated at 38'. This movement forces the link 39 downwardly, causing the pivot pin 29 to move in an arc about the pin 27 to a new position at 29'. In so doing it is obvious that the pin 29 has also moved toward the tractor a distance A—A' which is substantially equal to the distance B—B'. Because these distances A—A' and B—B' are substantially equal, it is apparent that the angle of the implement with respect to the ground has not been changed.

I claim:

1. Apparatus for coupling a soil engaging implement to a tractor comprising a frame, means for securing the frame to the rear portion of the tractor, a generally horizontal transverse bar journaled on the frame, first and second sets of ears secured to the bar and extending generally oppositely therefrom, links extending downwardly from said first set of ears, a pair of lower arms adapted for attachment near their rear ends to an implement and pivotally supported at their forward ends by said links, a second set of links pivotally connecting the forward ends of said lower arms to said frame, an upper control arm adapted for pivotal attachment at its rear portion to the implement and pivoted for free movement at its forward end to said second set of ears, and means for rocking said bar whereby the vertical position of the forward ends of both the upper and lower arms is varied without substantially varying the relative fore and aft positions of said forward ends thereby maintaining substantially constant the attitude of the implement to the ground.

2. Apparatus for coupling a soil engaging implement to a tractor comprising a frame, means for fastening the frame to the rear portion of a tractor, a pair of links pivotally attached near their forward ends to the frame a pair of lower arms each pivotally fastened at their forward ends by a pin to said links and adapted for pivotal attachment at their rear ends to an implement, a rock bar journaled to the frame, a pair of forwardly extending ear means on the bar, links connecting each of said pins to one of said ear means, a rearwardly projecting ear on the bar, an upper arm pivoted for free movement at its forward end to the rearwardly projecting ear and adapted for pivotal attachment at its opposite end to said implement, implement lifting means connecting the frame and rear portions of the lower arms, and means for rocking said bar, the arms and ears being disposed and arranged in such manner as to move the forward ends of the upper and lower arms vertically without changing the effective length of the arms.

3. Apparatus for connecting a tractor and the like to a soil engaging implement of the type having two laterally spaced lower draft arms and an upper arm all freely pivoted to the implement, comprising a frame, means for securing the frame to the tractor, a pair of spaced lower links pivoted to the frame at their forward ends and extending rearwardly for pivotal engagement with the forward ends of the lower draft arms, a laterally extending rock bar journaled on the frame above the lower links, forwardly projecting ears on the bar, rigid members pivotally connecting the rearward ends of said links with said forwardly extending ears, a rearwardly extending ear on the bar, means for freely pivoting the rearwardly extending ear to the forward end of said upper arm, and means for rocking said bar, said ears and links being so disposed and arranged as to move the upper and lower arms substantially equal distances in the same fore and aft direction when said bar is rocked.

4. Apparatus for connecting a tractor and the like to a soil engaging implement of the type having two laterally spaced lower draft arms and an upper arm all freely pivoted to the implement, comprising a frame, means for securing the frame to the tractor, a pair of spaced lower links pivoted to the frame at their forward ends and extending rearwardly for pivotal engagement with the forward ends of the lower draft arms, lifting arms on the frame pivotally coupled to said lower draft arms, a laterally extending rock bar journaled on the frame above the lower links, forwardly projecting ears on the bar, rigid members pivotally connecting the rearward ends of said links with said forwardly extending ears, a rearwardly extending ear on the bar, means for freely pivoting the rearwardly extending ear to the forward end of said upper arm, and means for rocking said bar, said ears and links being so disposed and arranged as to move the upper and lower arms substantially equal distances in the same fore and aft direction when said bar is rocked.

References Cited in the file of this patent

UNITED STATES PATENTS

| | | |
|---|---|---|
| 1,752,849 | Hudson | Apr. 1, 1930 |
| 2,249,861 | Silver | July 22, 1941 |
| 2,309,750 | Carrington | Feb. 2, 1943 |
| 2,383,689 | Silver | Aug. 28, 1945 |
| 2,518,215 | Wright | Aug. 8, 1950 |
| 2,580,532 | Dugger | Jan. 1, 1952 |

FOREIGN PATENTS

| | | |
|---|---|---|
| 983,884 | France | Feb. 14, 1951 |